Nov. 29, 1960 F. E. HOECKER ET AL 2,962,592
DOSIMETER
Filed May 27, 1957
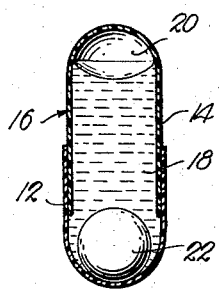
Fig. 1.
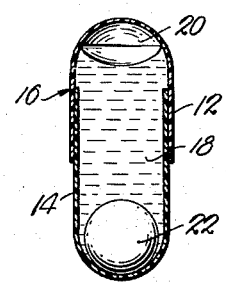
Fig. 2.
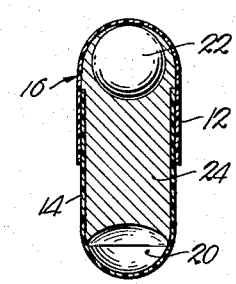
Fig. 3.
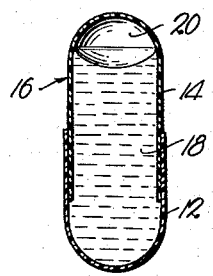
Fig. 4.
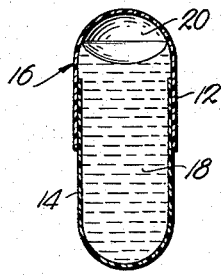
Fig. 5.
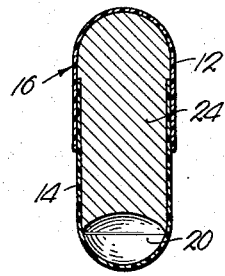
Fig. 6.
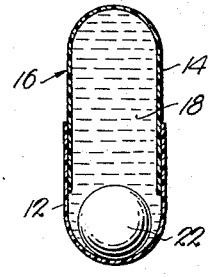
Fig. 7.
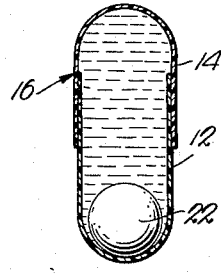
Fig. 8.
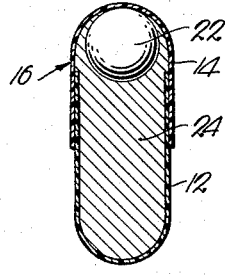
Fig. 9.
INVENTORS.
Frank E. Hoecker
Homer L. Hiebert
BY 
ATTORNEY.

United States Patent Office 2,962,592
Patented Nov. 29, 1960

2,962,592

DOSIMETER

Frank E. Hoecker, 1503 Haskell, Lawrence, Kans., and Homer L. Hiebert, Topeka, Kans.; said Hiebert assignor to said Hoecker Filed May 27, 1957, Ser. No. 661,631

10 Claims. (Cl. 250—83)

This invention relates to radiation dosimetry and more particularly, to simple and inexpensive dosimeter apparatus which will quantitatively detect and give an unmistakable visual indication of subjection of same to a predetermined dose of radiation, that is, to radiation at any given intensity or dose rate for a period of time sufficient to accumulate that dose for which the apparatus is intended to operate.

Many systems have been proposed and much experimental work has been done to detect and measure radiation at relatively high intensity or dose levels, but most of these proposals and previous methods have suffered from the defects of being relatively complex and necessitating skilled operators utilizing expensive, non-expendable apparatus. With the advent of radiation treatment of various products there has become a great need for simple, dependable, inexpensive and preferably expendable apparatus for measuring high dose levels at all energies, which is substantially foolproof and will indicate, even to an unskilled workman, the point when the material under treatment has been exposed to a predetermined amount of radiation. There is also a need for such apparatus, which is small, highly portable and adapted to be carried continuously by personnel working in laboratories and other facilities where radioactive materials or other sources of radiation are present, and which will give each workman a reliable indication of the accumulated radiation dose to which he has been subjected during a given period. Other applications for dosimeter apparatus of the kind mentioned will be apparent to those skilled in the art.

Certain previous experiments of others have indicated that polymerizatoin of monomeric substances may be accomplished by subjection of same to radiation. However, insofar as we are aware, no one has heretofore discovered that the relationship between a particular monomeric substance and the total radiation dose (intensity-time product) required to polymerize the same can be used in a practical device for indicating the occurrence of such radiation dose.

Radiation effects upon monomeric resins or other polymerizable substances appear to depend upon two basic processes, namely; cross-linking, which occurs by breaking of C–H bonds with consequent establishment of C–C bonds; and degradation, which is manifested by breaking of C–C bonds. In some substances, which will be referred to as radiation polymerizable materials, the cross-linking and formation of C–C bonds predominates over degradation and breaking of C–C bonds to thereby convert the material from one physical state into another. Such change of physical state usually involves conversion of a liquid into a gel or a solid. However, it is to be understood that a change in physical state from a solid to a liquid or gas may also occur as a result of radiation with other substances. Broadly, the utilization of either of such effects for detecting and indicating radiation is contemplated by this invention.

The primary object of this invention is to provide an inexpensive, dependable dosimeter which is adapted for detecting and indicating exposure thereof to a predetermined dose of radiation, and which contains a material which is characterized by being in a particular, normal physical state and has the property of undergoing transformation to another, observably different physical state upon exposure of the material to radiation of any given intensity for a period of time sufficient to accumulate the total dose required for producing the transformation.

A further important object of this invention is to provide a dosimeter as indicated which is dependent upon change in physical state of a material contained in the dosimeter upon exposure of the latter to a designated quantity of radiation, and which has means therein for readily indicating, by visual means, when the change in physical state caused by the amount of radiation has occurred.

Another important object of this invention is to provide a dosimeter for detecting designated quantities of radiation wherein a radiation polymerizable material having the property of undergoing transformation from a liquid state to a solid state upon exposure of the dosimeter to the particular quantity of radiation, is fabricatable as a small, relatively inexpensive capsule which is expendable and contains means for visually indicating polymerization and solidification of the material when the same has been exposed to the designated quantity of radiation.

Also an important object of this invention is to provide a dosimeter adapted to for detecting and indicating quantities of radiation which constitutes a small, transparent container having a quantity of liquid monomeric radiation polymerizable resin therein, and which has means in the container of a different specific gravity than the liquid monomer so as to readily indicate, by different orientation of the materials with respect to each other, when the dosimeter has received a sufficient amount of radiation to effect polymerization of the resin.

An additional important object of this invention is to provide a dosimeter as referred to above wherein there is included in the polymerizable material, an inhibiting agent which makes possible selective variance of the sensitivity of the polymerizable material to compensate for different radiation intensities encountered and for variable periods of time.

An equally important object of this invention is to provide a method of detecting and indicating the existence of a field of radiation of any intensity and any radiation energy wherein at least a pair of heterogeneous materials having differing specific gravities are confined together in such a manner that, since one of the materials is in a particular physical state and has the property of undergoing transformation to another physical state upon exposure of the material to radiation of any designated intensity, upon exposure of the materials to the indicated level of radiation such exposure may be readily determined by alteration of the physical orientation of the materials so confined.

Another important object is to provide a dosimeter which is applicable for any and all intensities (dose rates) and for all radiation energies.

Other important objects and specific details of the instant invention will become obvious or readily apparent as the following specification progresses when taken in conjunction with the appended drawing, wherein:

Fig. 1 is a central, longitudinal, cross-sectional view of the preferred embodiment of a dosimeter made in accordance with the concepts of the instant invention and illustrating two different ways in which polymerization of the liquid monomeric material may be readily indicated.

Fig. 2 is a view similar to Fig. 1 and illustrating the dosimeter thereof an in inverted position.

Fig. 3 is a view similar to Fig. 2 and illustrating the dosimeter in an inverted position after subjection of the same to a designated quantity of radiation and illustrating the manner in which polymerization of the material may be indicated by relative orientation of substances of differing specific gravity contained in the material.

Fig. 4 is a central, longitudinal, cross-sectional view of a dosimeter constructed in accordance with another embodiment of the invention, illustrating the relative orientation of a bubble utilized in indicating polymerization of the material contained in the dosimeter.

Fig. 5 is a view similar to Fig. 4 and illustrating the relative position of the material and the bubble in an inverted position.

Fig. 6 is a view similar to Fig. 5 showing relative positions of the bubble with respect to the material after the same has been polymerized by exposure of the dosimeter to a designated quantity of radiation.

Fig. 7 is a central, longitudinal, cross-sectional view of a dosimeter wherein there is contained in the polymerizable material an element having a higher specific gravity than the polymerizable liquid.

Fig. 8 is a view similar to Fig. 7 and showing the relative position of the heavier object with respect to the liquid material before exposure of the dosimeter to a particular quantity of radiation which effects polymerization of the material, the dosimeter being inverted; and Fig. 9 is a view similar to Fig. 8, illustrating the dosimeter in an inverted position and showing the relative position of the heavier object with respect to the polymerized material after exposure of the dosimeter to the designated quantity of radiation.

Briefly, the instant invention comprises a small, elongated, transparent capsule containing a quantity of a polymerizable, monomeric resin, which is adapted to undergo polymerization upon exposure of the resin to a designated quantity of radiation, either electromagnetic radiation or high energy particles such as electrons, protons, neutrons and the like. Inasmuch as it is most usually difficult to visually ascertain change in physical state of the material upon exposure to a particular quantity of radiation, it is desirable to include means of differing specific gravities in the polymerizable resin so as to readily indicate the change in physical state thereof.

Referring to the drawing, there is shown in Figs. 1 to 9 inclusive, a dosimeter constructed according to the concepts of the instant invention and which, in one form thereof, consists of a relatively small, elongated capsule which comprises an end section 12 into which is telescoped a second end section 14 to thereby present a closed container 16. Although various materials can be utilized in the construction of container 16, it has been found that readily available gelatin capsules serve admirably for this purpose and may be procured at a small cost.

Confined within container 16 is a liquid monomeric resin 18 which is polymerizable to a solid state upon exposure of the container 16 having the resin 18 therein to a given dose of radiation. As is observable in Fig. 1, the quantity of liquid resin 18 confined within container 16 is somewhat less than the internal volume of container 16 so as to present a bubble 20 which, being of less specific gravity than the liquid monomer 18, orientates itself at the top of the container 16 when the latter is located with its longitudinal axis in an upright position. Also included in the preferred embodiment of the invention as shown in Fig. 1, is a spherical lead ball 22 which has a higher specific gravity than the liquid monomeric resin 18 so that, when container 16 is located with its longitudinal axis in an upright position, ball 22 is disposed at the lowermost end thereof.

Thus, it can be seen in Fig. 2 of the drawing that, prior to polymerization and solidification of the liquid monomeric material 18 by exposure of the container 16 to a designated quantity of radiation, when the container 16 is inverted, bubble 20 rises to the uppermost end of the container 16, while ball 22 descends to the lowermost end thereof because of the difference in specific gravities.

However, in Fig. 3 of the drawing, after exposure of the liquid monomeric material 18 to radiation of any intensity and any energy for a predetermined period of time, the monomeric material polymerizes and changes physical state to a solid 24. In this state it can be ascertained that inversion of the container 16 results in the lead ball 22 remaining at the uppermost end of the container 16 while bubble 20 likewise remains at the lowermost end thereof. Thus, change in physical state of the liquid monomeric material 18 to the solid form 24 is readily visually observable.

Although the preferred embodiment of the invention is illustrated in Figs. 1 to 3 inclusive, it is shown in Figs. 4 to 6 inclusive that the lead ball 22 may be eliminated and change in physical state of the monomeric material 18 to the solid form 24 may be quickly ascertained by relative disposition of the bubble 20.

By the same token, it may, in some instances, be desirable to utilize only the lead ball 22 for indicating polymerization of the monomeric material 18 and therefore, Figs. 7 to 9 inclusive illustrate a container 16 wherein the monomeric material 18 completely fills the internal volume thereof and no provision is made for an air space forming a bubble 20. It can be seen in Fig. 9 that formation of the solid state 24 is readily observable by the fact that lead ball 22 remains at the uppermost end of container 16 upon inversion thereof. It should also be pointed out that a steel ball 22 may be utilized if desired and in this instance, polymerization may be ascertained in another way by use of magnetic attraction to indicate whether solidification of material 18 has occurred.

Various materials may be confined within container 16 to indicate quantitatively a definite amount of radiation, but it has been found preferable to utilize a monomeric resin which is initially in a liquid state and which has the property of undergoing transformation to a solid state upon exposure of the material to radiation of any intensity and for a period of time sufficient to accumulate a predetermined radiation dose.

In this respect, it has been found that a styrene-polyester resin is of value in indicating and detecting radiation because it gels or solidifies at relatively low doses of radiation and thus is a suitable dosimetric substance in a practical dose range. In many instances, it is desirable to utilize several different types of resins so as to selectively vary the radiation response thereof and permit variance of the sensitivity to different energy levels. One polyester which is operable when confined in container 16 is a thermosetting polyester resin supplied by Ward's Natural Science Establishment, Inc., 3000 Ridge Road East, Rochester, New York, which is sold under the trade name "Bio-Plastic" and which is ordinarily polymerizable by addition of a catalyst such as tertiary-butyl-hydroperoxide but which has been found to gel or solidify without catalyzation under radiation of a predetermined total amount or dose. This resin is transparent in a monomeric form and also polymerizes to a transparent solid. In its monomeric state it has a specific gravity at 25° C. of 1.13, viscosity at 25° C., 525 cps., and in its solid state has a specific gravity at 25° C. of 1.22, hardness on the Rockwell M scale of 115 and a heat distortion point of approximately 90° C. Inasmuch as some of the monomeric materials utilized are polymerizable under the action of sunlight, which is in essence a radiation reaction, it is sometimes desirable to tint the container 16 so as to reduce the effect of sunlight, it being apparent that tinting of the capsule in no manner prevents visual observance of the relative positions of the bubble 20 and ball 22.

Although "Bio-Plastic" is of particular importance because of its meeting all of the requirements with respect to polymerization within a desirable range of radiation, it has additionally been found that other materials such as polyethylene, polystyrene, the acrylic resins, styrene polyesters, certain oils, and other similar materials respond to radiation in an effective manner.

Experiments in evaluating the effect of various intensities of radiation for different times on liquid monomeric materials were conducted and several gelatin capsules such as container 16 were utilized to prepare a dosimeter containing a volume of approximately 1.5 ml. of the dosimetric, polymerizable resin in each capsule. As shown in Fig. 1, conversion of the liquid monomeric resin, which in this case was a thermosetting polyester, was made readily observable by including in the container 16 a small spherical lead shot such as 22, and by leaving a small unfilled space above the liquid to provide air bubble 20. A plurality of the containers 16 containing the tested substances were irradiated with the long axis vertical and parallel to the direction of radiation.

For the purposes of the study, a 250 k.e.v. (kilo-electron-volts) resonance transformer X-ray unit with a beryllium window tube was utilized and the radiation was suitably filtered when it was desired to eliminate low frequency radiation produced by the unit. In addition, the 1.25 m.e.v. radiation from a therapeutic cobalt-60 unit was utilized to produce radiation of other intensities and energies. Dose rate variation was achieved by varying the tube current supplied to the X-ray units or by varying the distance of the units from the tested material, or both. Radiation doses were measured with a Victoreen condenser-r-meter using chambers of suitable dose range and wall thickness. The lead ball 22 and bubble 20 were found desirable because of the fact that change in physical state of the liquid monomer 18 to the solid form 24 is not accompanied by easily detected changes in optical properties and therefore, the physical changes could be easily distinguished by relative orientation of the ball 22 and bubble 20 with respect to the polymerized material 24.

The extent of gelation or solidification of the liquid monomeric material was determined by inverting the container after irradiation and observing the movement of lead ball 22 or bubble 20 or both. Quantitative results were obtained by measuring the thickness in mm. of solidified material with reference to the line formed around the middle of container 16 by the end of end section 12 which was disposed in substantially the center of container 16, this end serving as the index line for all measurements. An effort was made in irradiating the containers to deliver a dose which would result in the fall of the sphere to this index line when the container was inverted, variations of the sphere from this line being measured in millimeters along the axis of the container and thus, evaluation of the amount of dose corresponding to 1 mm. of fall of the sphere permitted evaluation of the reproducibility of results.

Ten containers 16 as nearly identical as possible were simultaneously irradiated by arranging the same in one plane in a circular pattern about the central axis of the radiation beam. The containers 16 were supported in a thin block of styrene foam in order to reduce scattered radiation to a negligible amount, and uniformity of irradiation was insured by rotation of the ring of containers 16 about the central axis of the radiation beam. The intensity of the beam was calibrated at a point coincident with the index line on the containers 16. Additionally, the measured intensity in air in Roentgens per minute was corrected for absorption of radiation in the overlying plastic or gelatinous material forming containers 16. The total dose delivered was calculated as the product of intensity (R/min.) × irradiation time. The total dose may be conveniently expressed in rads on the assumption that the dosimetric substance is, for all practical purposes, equivalent to tissue.

Groups of ten containers 16 were exposed to radiation of various intensities and energies, and for different periods of time, the energy level being varied by changing the tube voltage of the X-ray machines and the intensity changed by varying the distance of the unit from the test containers. The experiments conclusively established the fact that, when the dose rate is plotted along the abscissa and the total dose along the ordinate, even when different intensities of radiation were used for different periods of time, the dose required for gelation at the index line is essentially independent of dose rate. In other words, a definite quantity of radiation for a particular time is necessary to cause gelation, and for a lesser amount of radiation a longer exposure time is necessary and vice versa. By the same token, it was conclusively proved that the dose required for gelation is substantially independent of radiation energy within the limits of errors of the measurements. Errors of measurement were found to be less than 1% of the total dose required for gelation. Although the tests indicated that the results are not entirely consistent at energy levels below 100 k.e.v., the empirical results conclusively established that for high radiation energy levels, for example in excess of 150° k.e.v., the response to radiation is independent of radiation energy and independent of dose rate in excess of 500 Roentgens per minute and is, therefore, a substantially linear product function of the intensity level and time of irradiation.

The tests above described disclosed that the reaction produced by the radiation was not complete until sometime after the termination of irradiation. Results of investigation of this after effect indicate that for widely different doses, the time required for completion of the reaction after delivery of a given dose is approximately 30 minutes, this being true whether the dose is delivered continuously or intermittently. It thus can be seen that a simple dosimeter based on radiation polymerization of a liquid monomeric resin has been developed which is very inexpensive and can be read without auxiliary equipment which needs skilled operators. Thus, the dosimeter capsules are especially adapted for utilization in those industries wherein the workmen exposed to the radiation do not have sufficient education to operate complex radiation testers and it is completely impractical to train the same in the use of such apparatus. The dosimeter herein presented is adapted for use by merely carrying the same on the person, and a dangerous level of radiation intensity can readily be ascertained by shifting the container 16 to various positions to visually observe whether or not the ball 22 or bubble 20 change position in respect to the pull of gravity.

The dosimeter as above outlined may also be used to measure an unknown dose of radiation which is below the amount necessary to cause complete polymerization of the monomeric material 18. In this procedure, the dosimeter is exposed to the unknown quantity of radiation and then the latter exposed to an additional known dose sufficient to cause polymerization. The difference between the predetermined dose required to polymerize and the known dose gives the magnitude of the unknown dose.

It should also be pointed out herein that a means has been devised for varying the sensitivity of the liquid monomeric material 18 to irradiation, and of importance is the observation that an inhibiting agent may be added to the resin in necessary quantities to inhibit the polymerization of the monomeric material a specific degree. Although many substances exhibit this inhibiting action when added to the liquid resin, the most important have been found to be a halogen such as iodine, a ketone such as acetone, and oxygen. Of these, the preferred inhibiting agent is iodine because it has been found that there is a linear relation between the amount of iodine included in the monomeric material and the dose required to polymerize the monomer. In other words, the sensitivity of the monomeric resin to polymerization is exactly dependent upon the amount of iodine added to the material.

It can also be understood that the present invention is not limited expressly to a dosimetric capsule wherein a liquid monomeric resin is polymerized to a solid state by a definite quantity of radiation, but other substances which behave in different manners under exposure to radiation may be utilized. More specifically, substances which are in a solid form and which undergo transformation to a liquid by exposure to radiation are operable, as well as those substances which change form from a gas to a liquid or to a solid, or from a solid to a liquid or a gas. By the same token, other means may be utilized for visually indicating transformation of physical state of the indicating material.

It is also to be noted that dose range coverage may be attained by combining several of the containers 16 into a single unit, three different size containers being utilized and enclosing the smallest in the middle size, and both in turn in the largest, each container having therein a liquid of different sensitivity to radiation to thereby indicate relative degrees of exposure. Also, dose range coverage may be provided by measuring the change in viscosity of the material which is undergoing polymerization. Thus, it can be seen that the relative dosage can be determined by accurately timing the relative rate of drop of the ball or rise of the bubble before gelation occurs.

Because of the fact that the polymerizable material utilized in container 16 may be chosen or inhibited to manifest a sensitivity to radiation equivalent to that of tissue, it is manifest that the dosimeter 10 can give a dependable, accurate measure of biological response to radiation and thus may be utilized to indicate when humans or animals have become exposed to dangerous levels of radiation.

Having thus described the invention what is claimed as new and desired to be secured by Letters Patent is:

1. A dosimeter adapted for detecting and indicating exposure to radiation of any given intensity for a correspondingly predetermined period of time comprising a container; a quantity of material in the container, said material initially being in a fluid physical state and having the property of undergoing transformation to a solid physical state upon exposure of the material to radiation of said intensity for said period of time; and movable means in the container for readily indicating by the relative movability of the same, the physical state transformation of the material upon exposure of the latter to radiation of said intensity for said period of time.

2. A dosimeter adapted for detecting and indicating exposure to radiation of any given intensity for a correspondingly predetermined period of time comprising a container; a quantity of liquid monomeric material in the container and having the property of undergoing polymerization to a solid state upon exposure of the material to radiation of said intensity for said period of time; and movable means in the container for readily indicating by relative movability of the same, polymerization and change in physical state of the material upon exposure of the latter to radiation of said intensity for said period of time.

3. A dosimeter adapted for detecting and indicating exposure to radiation of any given intensity for a correspondingly predetermined period of time comprising a hollow, closed container, at least a portion of which is substantially transparent; a quantity of material in the container, said material initially being in a fluid physical state and having the property of undergoing transformation to a solid physical state upon exposure of the material to radiation of said intensity for said period of time; and movable means in the container and observable externally thereof through said transparent portion of the container for readily indicating by relative movability of the same, change in physical state of the material upon exposure of the latter to radiation of said intensity for said period of time.

4. A dosimeter adapted for detecting and indicating exposure to radiation of any given intensity for a correspondingly predetermined period of time comprising a hollow, closed container, at least a portion of which is substantially transparent; and a quantity of material in the container, said material being in a fluid physical state and having the property of undergoing transformation to a solid physical state upon exposure of the material to radiation of said intensity for said period of time, said quantity being somewhat less than the internal volume of the container to present a bubble which is movable when the material is in said fluid state, the movement of the bubble being observable externally of the container through said portion thereof whereby relative movability of the bubble readily indicates change in physical state of the material upon exposure of the latter to radiation of said intensity for said period of time.

5. A dosimeter adapted for detecting and indicating exposure to radiation of any given intensity for a correspondingly predetermined period of time comprising a hollow, closed container, at least a portion of which is substantially transparent; a quantity of material in the container, said material being in a fluid physical state and having the property of undergoing transformation to a solid physical state upon exposure of the material to radiation of said intensity for said period of time; and a movable, solid object of greater density than the material, disposed in the latter within the container and observable externally thereof through said portion of the container for readily indicating by relative movability of the same, change in physical state of the material upon exposure of the latter to radiation of said intensity for said period of time.

6. A dosimeter adapted for detecting and indicating exposure to radiation of any given intensity for a correspondingly predetermined period of time comprising a hollow, closed container, at least a portion of which is substantially transparent; a quantity of material in the container, said material being in a fluid physical state and having the property of undergoing transformation to a solid physical state upon exposure of the material to radiation of said intensity for said period of time, said quantity of material being somewhat less than the internal volume of the container to present a bubble which is movable when the material is in one of its physical states; and a movable, solid object disposed in the material within the container, the bubble and the object being observable externally of the container through said portion thereof for readily indicating by relative movability of the same, change in physical state of the material upon exposure of the latter to radiation of said intensity for said period of time.

7. A dosimeter adapted for detecting and indicating exposure to radiation of any given intensity for a correspondingly predetermined period of time comprising a hollow, closed, sectional, elongated, substantially transparent, tubular container provided with a pair of substantially cylindrical sections, each of said sections having an open end and a closed end, the open end of one of the sections being telescoped within the open end of the other section; a quantity of liquid monomeric resin in the container and having the property of undergoing polymerization to a solid polymer upon exposure of the resin to radiation of said intensity for said period of time; and movable means in the container and observable externally thereof through said portion for readily indicating by relative movability of the same, polymerization and solidification of the resin upon exposure of the latter to radiation of said intensity for said period of time.

8. A dosimeter adapted for detecting and indicating exposure to radiation of any given intensity for a correspondingly predetermined period of time comprising a container; a quantity of material in the container, said material initially being in a fluid physical state and having the property of undergoing transformation to a solid physical state upon exposure of the material to radiation of a particular intensity for a designated period of time; an amount of inhibiting agent in said material for varying the sensitivity of the latter to said radiation; and movable means in the material in said container for readily indicating by relative movability of the same, change in physical state of the material upon exposure of the latter to radiation at a sufficient intensity and for the necessary period of time as governed by the amount of said agent added to the material.

9. A dosimeter adapted for detecting and indicating exposure to radiation of any given intensity for a correspondingly predetermined period of time comprising a container; a quantity of liquid monomeric resin in the container and having the property of undergoing polymerization to a solid polymer upon exposure of the material to radiation of a particular intensity for a designated period of time; an amount of iodine in the latter for varying the sensitivity of the resin to said radiation; and movable means in the material in said container for readily indicating by relative movability of the same, polymerization and solidification of the resin upon exposure of the latter to radiation at a sufficient intensity and for the necessary period of time as governed by the amount of agent added to the resin.

10. A dosimeter adapted for detecting and indicating exposure to radiation of any given intensity of at least 150 k.e.v. (kilo-electron-volts) for a correspondingly predetermined period of time comprising a container; a quantity of liquid monomeric resin in the container and having the property of undergoing polymerization to a solid polymer upon exposure of the resin to radiation of at least approximately 150 k.e.v. (kilo-electron-volts) for said period of time; and movable means in the container for readily indicating by relative movability of the same, polymerization and solidification of the resin upon exposure of the latter to radiation of at least approximately 150 k.e.v. (kilo-electron-volts) for said period of time.

References Cited in the file of this patent

UNITED STATES PATENTS

| | | |
|---|---|---|
| 1,241,738 | Klatte et al. | Oct. 2, 1917 |
| 2,524,862 | White | Oct. 10, 1950 |
| 2,700,736 | Roberts | Jan. 25, 1955 |
| 2,789,232 | Block | Apr. 16, 1957 |